E. R. PELLING.
MOTOR TRACTOR.
APPLICATION FILED JUNE 3, 1920.

1,412,419.

Patented Apr. 11, 1922.
2 SHEETS—SHEET 1.

INVENTOR.
Ernest Richard Pelling.

per Robert E. Phillips
Attorney.

E. R. PELLING.
MOTOR TRACTOR.
APPLICATION FILED JUNE 3, 1920.

1,412,419.

Patented Apr. 11, 1922.
2 SHEETS—SHEET 2.

INVENTOR
Ernest Richard Pelling per Robert Phillips
Attorney.

UNITED STATES PATENT OFFICE.

ERNEST RICHARD PELLING, OF CROYDON, ENGLAND, ASSIGNOR OF ONE-HALF TO VICTOR ALEXANDER MATTICK, OF BECKENHAM, KENT, ENGLAND.

MOTOR TRACTOR.

1,412,419.   Specification of Letters Patent.   Patented Apr. 11, 1922.

Application filed June 3, 1920. Serial No. 386,417.

(GRANTED UNDER THE PROVISIONS OF THE ACT OF MARCH 3, 1921, 41 STAT. L., 1313.)

*To all whom it may concern:*

Be it known that I, ERNEST RICHARD PELLING, a subject of the King of Great Britain and Ireland, residing at the Engineer's House, Selsdon Park, Croydon, in the county of Surrey, England, have invented a new and useful Improvement in Motor Tractors, (for which I have obtained a patent in Great Britain May 26, 1917, Patent No. 116,131,) of which the following is a specification.

This invention relates to motor tractors and has for its object a construction which is specially adapted for the haulage of balanced or anti-balanced plows of the one-way type and which can be readily converted into a tractor for general haulage purposes.

I attain this end by the construction hereinafter more particularly specified and shown in the accompanying drawings in which:—

Figure 1:
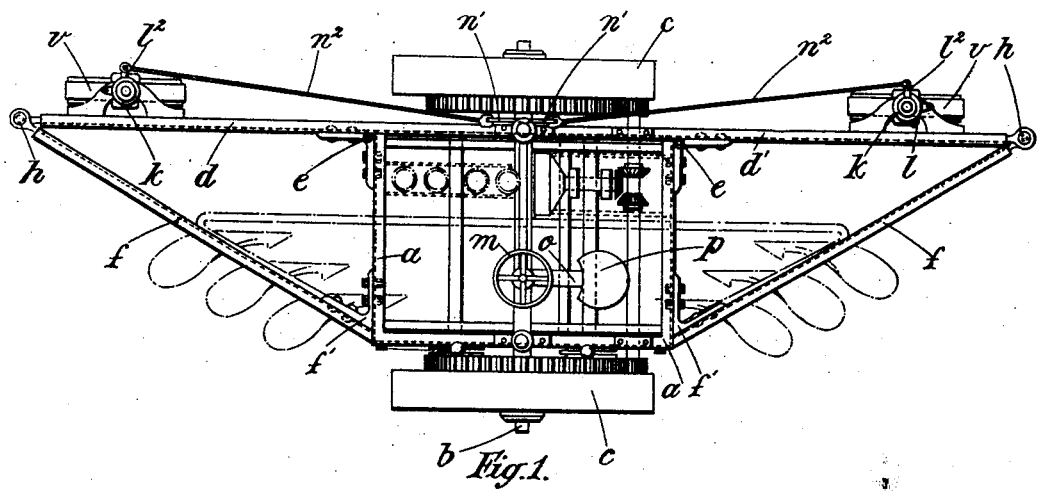
Figure 2:
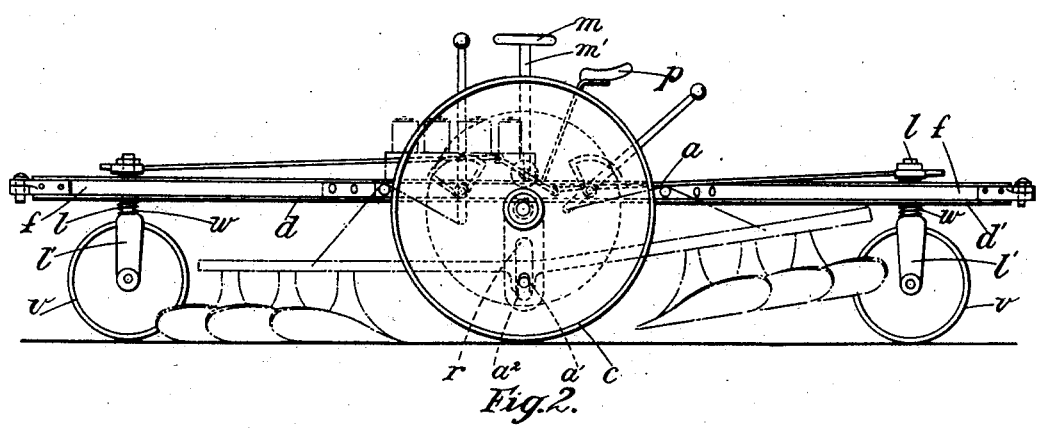
Figure 3:
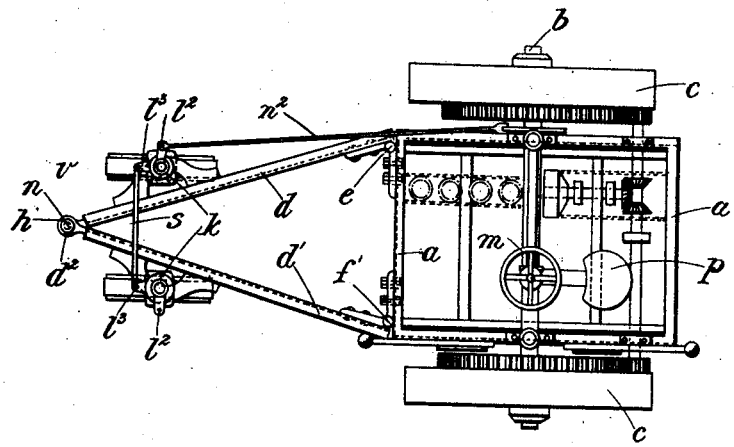
Figure 4:
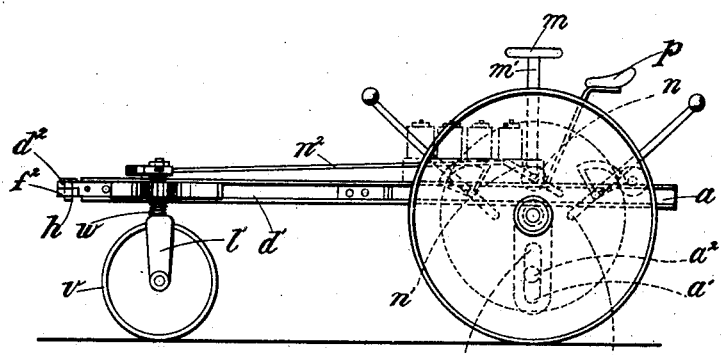

Figs. 1 and 2 are views in side elevation and plan respectively showing the tractor arranged for hauling a balanced or anti-balanced one-way plow, and Figs. 3 and 4 are similar views showing the tractor converted for use for general haulage purposes.

Throughout the views similar parts are marked with like letters of reference.

The tractor comprises essentially a central or main frame $a$ carrying a transverse axle $b$ carrying two driving wheels $c$ and $c$, the power unit, the variable speed and reverse gearing and the transmission gear all of which may be of any suitable type and as they form no part per se of the present invention call for no further description.

Extending from the opposite ends of the frame $a$ on one side thereof are beams $d$ and $d^1$ which are connected to said frame by vertically arranged pivotal joints $e$. Each of these beams is kept in its proper relative position to the frame $a$ by a stay rod $f$ which is secured to the frame $a$ by brackets $f^1$ and to its beams by a pin $h$ engaging a socket $f^2$ at its free end and a socket $d^2$ at the free end of the beam.

Each of the beams $d$ and $d^1$ carries a head or socket $k$ in which is mounted the stem $l$ of a fork $l^1$ carrying a steering wheel $v$ said stem being telescopically mounted in the head or socket $k$ carried by said beam, a suitable cushioning spring $w$ being interposed between the head of the fork and the under side of the head or socket so as to provide for both steering wheels accommodating themselves to the inequalities of the surface of the ground.

The control steering wheel $m$ is mounted at or about the centre of the frame $a$ and is coupled to the forks $l^1$ carrying the steering wheels $v$ by suitable coupling mechanism comprising a transverse shaft $n$ geared to the pillar $m^1$ carrying the controlling wheel $m$, two arms $n^1$ $n^1$ fixed on said shaft and rods $n^2$ coupling said arms with arms $l^2$ carried by the forks $l^1$ $l^1$. On the pillar $m^1$ carrying the control steering wheel $m$ is mounted a swinging arm $o$ which carries a seat $p$ for the driver so that said seat can be moved into a position either fore or aft of said controlling wheel according to the direction in which the tractor is to be driven.

A transversely arranged cross bar $r$ mounted in slots $a^1$ in arms $a^2$ carried by the frame $a$ is provided for the attachment of the frame of the plow and the usual screw mechanism is provided for lifting and lowering said bar.

To convert the tractor for use for general haulage purposes the plow is first disconnected from the cross bar $r$ and the connecting rod $n^2$ of the steering mechanism of the steering wheel carried by the beam $d^1$ is disconnected both from the arm $n^1$ of the controlling mechanism and from the arm $l^2$ of the fork carrying the steering wheel. The stay rod $f$ of the beam $e^1$ is then removed and the beam $e^1$ with its hinge joint $e$ is then detached from the frame $a$ and is fixed on the other end of said frame opposite to the beam $d$ the stay rod $f$ of which is first removed. The free ends of the two beams $d$ and $d^1$ are then swung inwardly until they meet and are then secured to one another by engaging one of the pins $h$ with the two sockets $d^2$ and $d^2$ at the free ends of the beams.

The fork $l^1$ of the steering wheel $v$ carried by the beam $d^1$ is then coupled to the fork $l^1$ carrying the other steering wheel by means of a coupling rod $s$ connected to two other arms $l^3$ carried by the forks $l^1$ and $l^1$. The tractor now has both its steering wheels at the same end of the main frame whereby the length of the tractor is considerably reduced making it much more handy for use for general haulage purposes.

I claim:—

1. A motor tractor comprising a main frame supported by two driving wheels, a power unit carried by said frame, gearing coupling said power unit to said wheels, two beams pivoted respectively to the opposite ends of the main frame on the same side thereof one of said beams being detachable from said frame and capable of attachment to the other end thereof, a head or socket carried by each of said beams, a fork mounted in each head or socket, a steering wheel mounted in each said fork, means for controlling said steering wheels, detachable stay rods attached to said beams near their free ends and attached to the main frame on the opposite sides thereof, and means for coupling the two beams together at one end of the main frame.

2. A motor tractor comprising a main frame supported by two driving wheels, a power unit carried by said frame, gearing coupling said power unit to said wheels, two beams pivoted respectively to the opposite ends of the main frame on the same side thereof one of said beams being detachable from said frame and adapted to be pivotally attached to the other end thereof, a head or socket carried by each of said beams, a fork mounted in each head or socket, a steering wheel mounted in each said fork, a cushioning spring located between the top of each of said forks and the underside of each of said heads or sockets, means for controlling said steering wheels, detachable stay rods attached to said beams near their free ends and attached to the main frame on the opposite sides thereof and means for coupling the two beams together at one end of the main frame.

3. A motor tractor comprising a main frame supported by two driving wheels, a motor carried by said frame, gearing coupling said motor to said wheels, two extension beams one pivoted to one end of the main frame on one side thereof so that it can be swung inwards towards the centre of said frame and the other detachably mounted on the other end of said main frame on the same side thereof as the other beam and capable of being shifted to the same end of the main frame as the other beam, a head or socket carried by each of said beams, a fork mounted in each head or socket, a steering wheel mounted in each said fork, a cushioning spring located between the top of each of said forks and the underside of each of said heads or sockets, stay rods operating between the beams and the main frame, means for securing the free ends of the two beams to one another, coupling mechanism between the two steering wheels, and controlling mechanism for operating said steering wheels through said coupling means.

4. A motor tractor comprising a main frame supported by two driving wheels, a motor carried by said frame, gearing coupling said motor to said wheels, two extension beams one pivoted to one end of the main frame on one side thereof so that it can be swung inwards towards the centre of the machine and the other detachably mounted on the other end of said main frame on the same side thereof as the other beam and capable of being shifted to the same end of the main frame as the other beam a head or socket carried by each of said beams, a fork mounted in each head or socket, a steering wheel mounted in each said fork, a cushioning spring located between the top of each of said forks and the underside of each of said heads or sockets, stay rods coupled to the free ends of said beams and to the main frame, means for coupling the free ends of the two beams together when they are located at the same end of the main frame, coupling mechanism between the two steering wheels, a controlling mechanism for operating said steering wheels through said coupling means, a pivoted swinging seat mounted on the main frame a transverse draught bar carried by the main frame and means for raising and lowering said bar.

ERNEST RICHARD PELLING.